April 26, 1932. W. L. BAKER ET AL 1,855,540
WASHING AND COOKING MACHINE
Filed Aug. 1, 1929 5 Sheets-Sheet 3
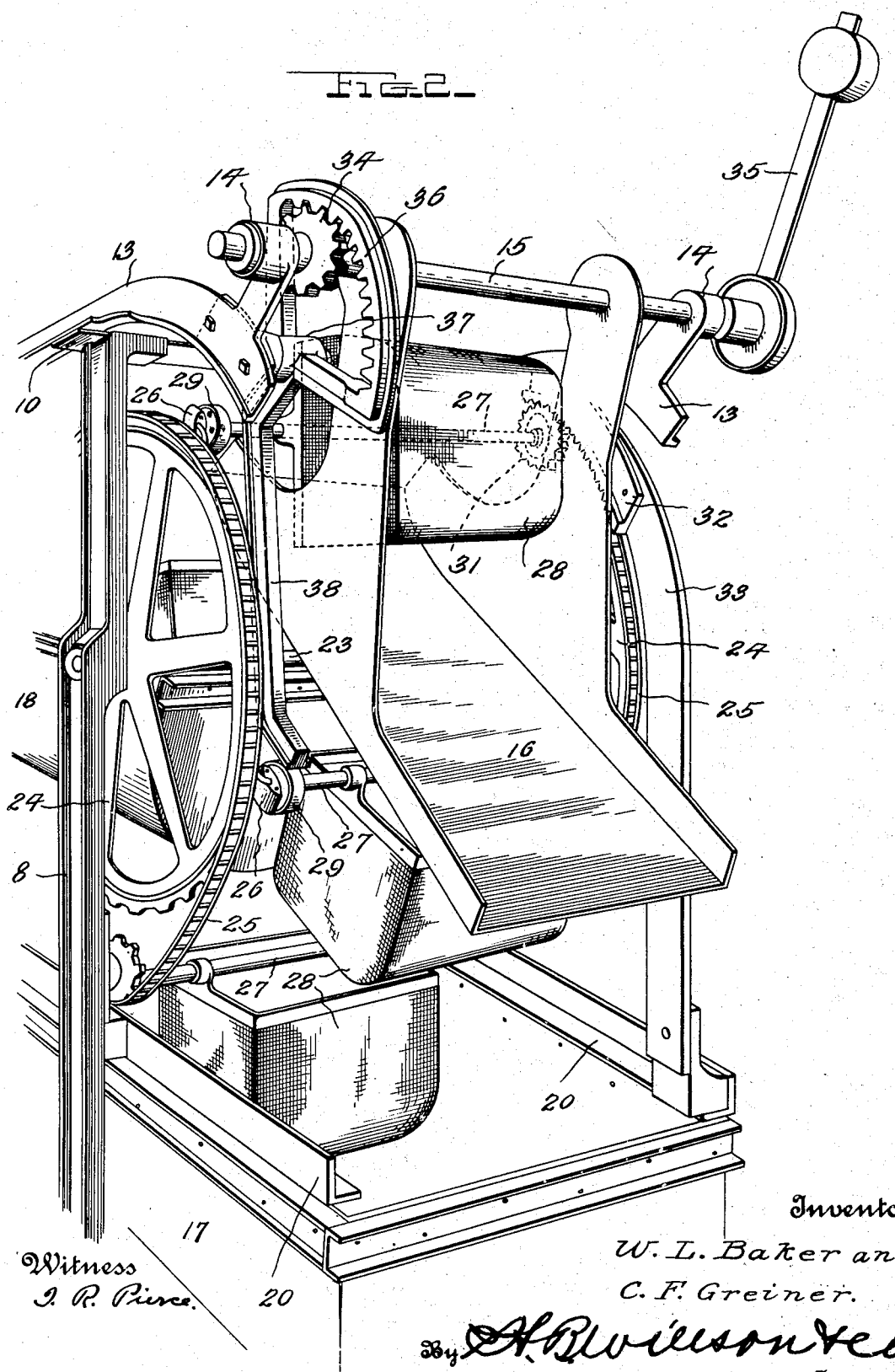
Inventors
W. L. Baker and
C. F. Greiner.
By H. B. Willson & Co.
Attorneys
Witness
J. R. Pierce

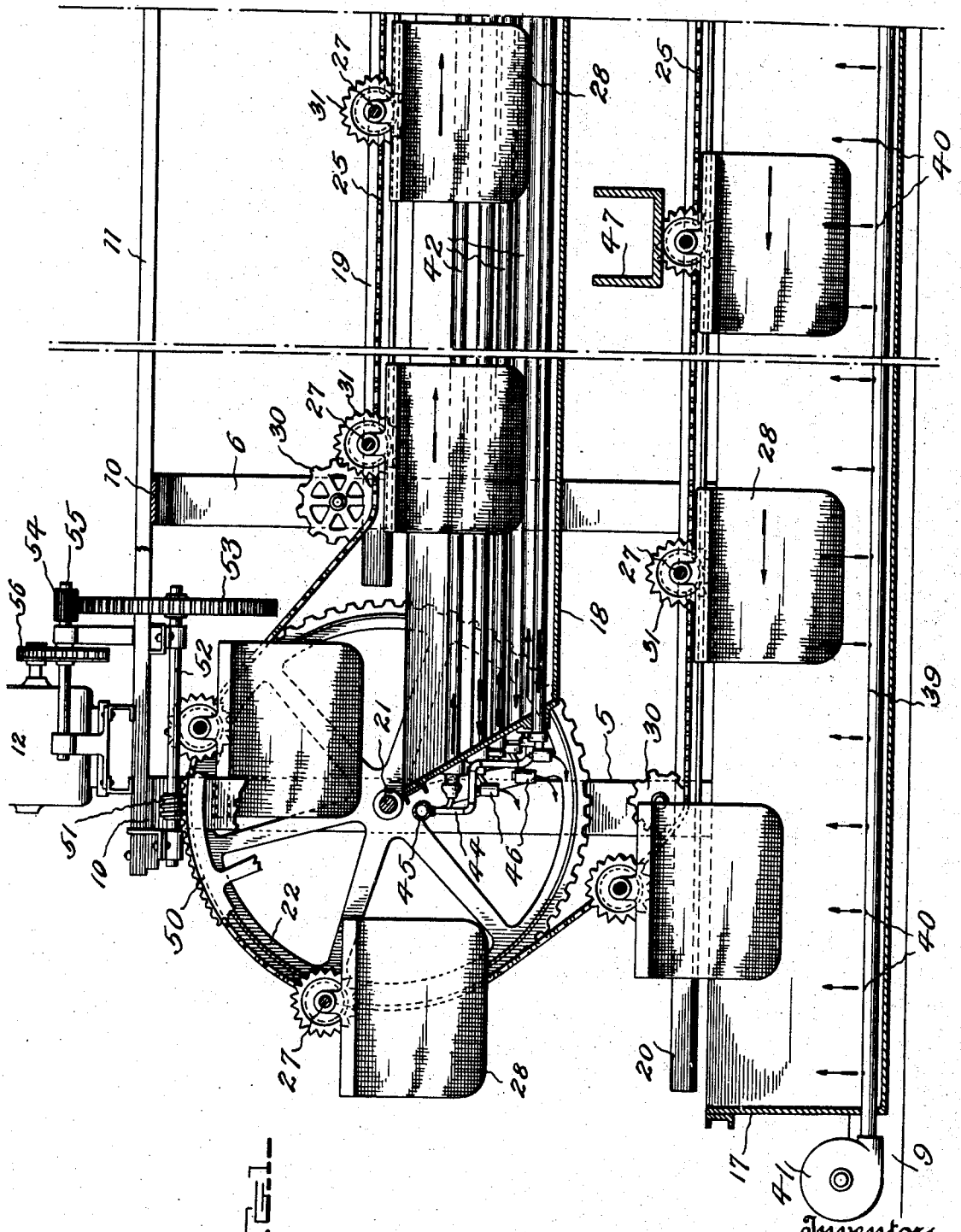

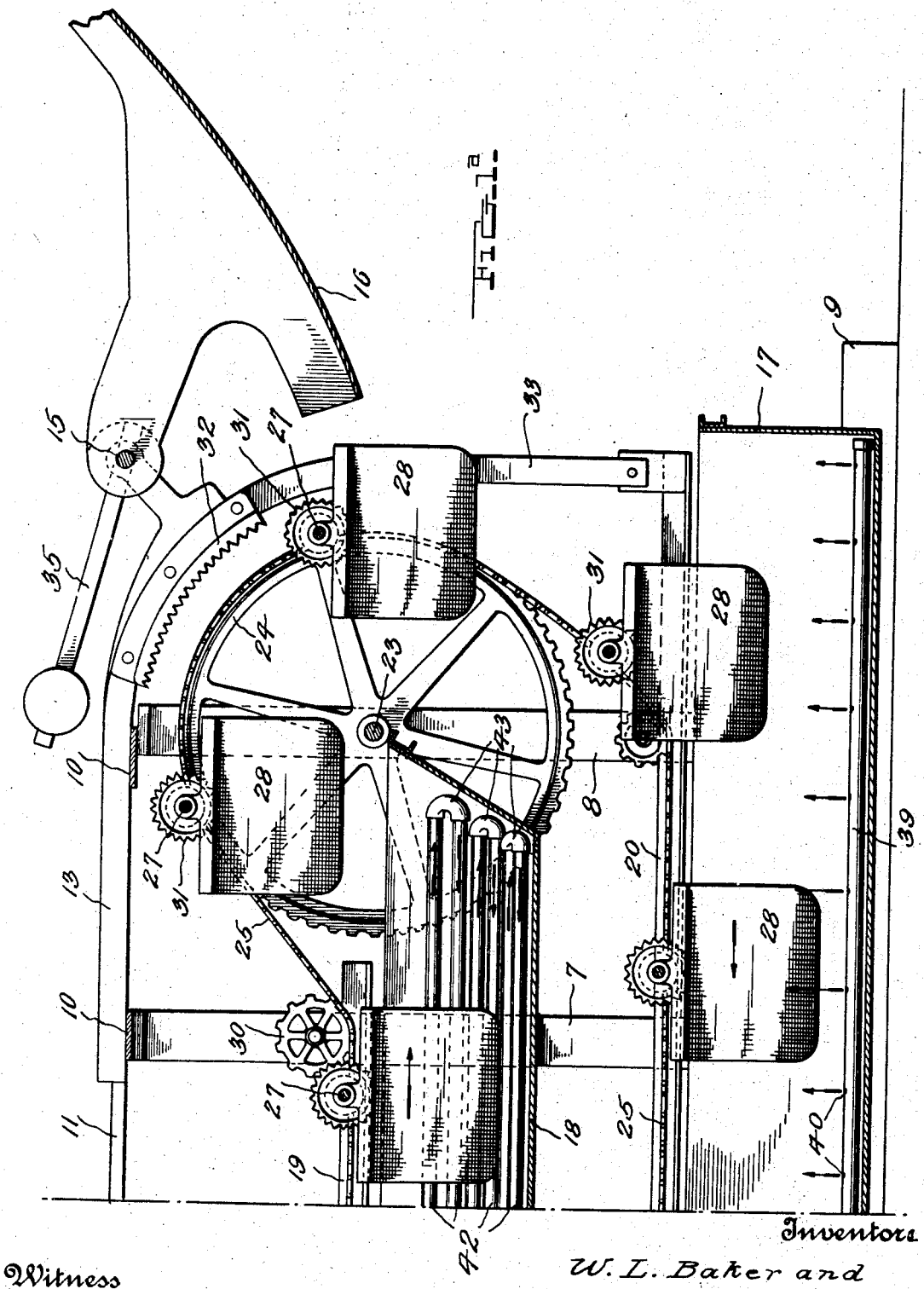

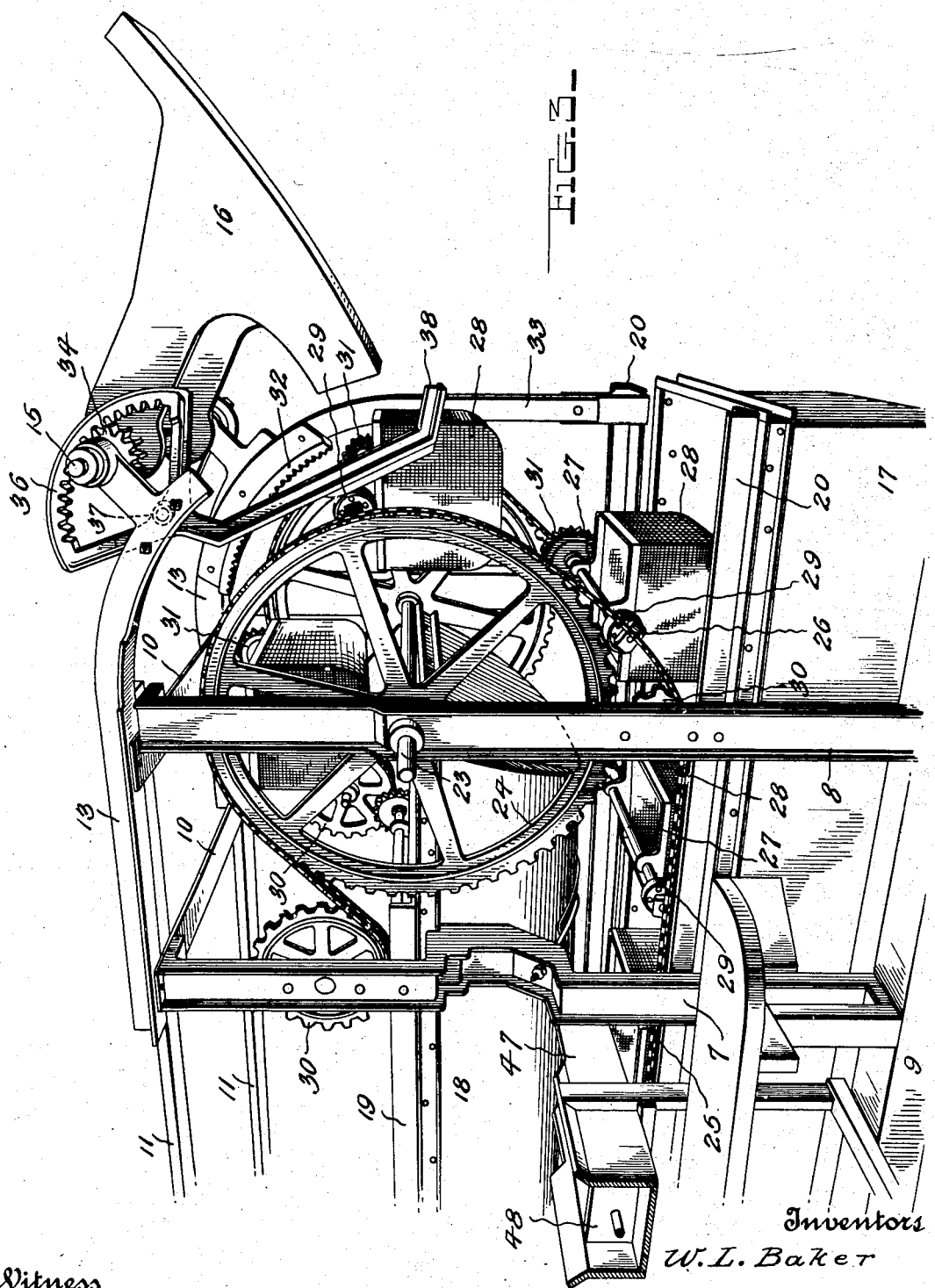

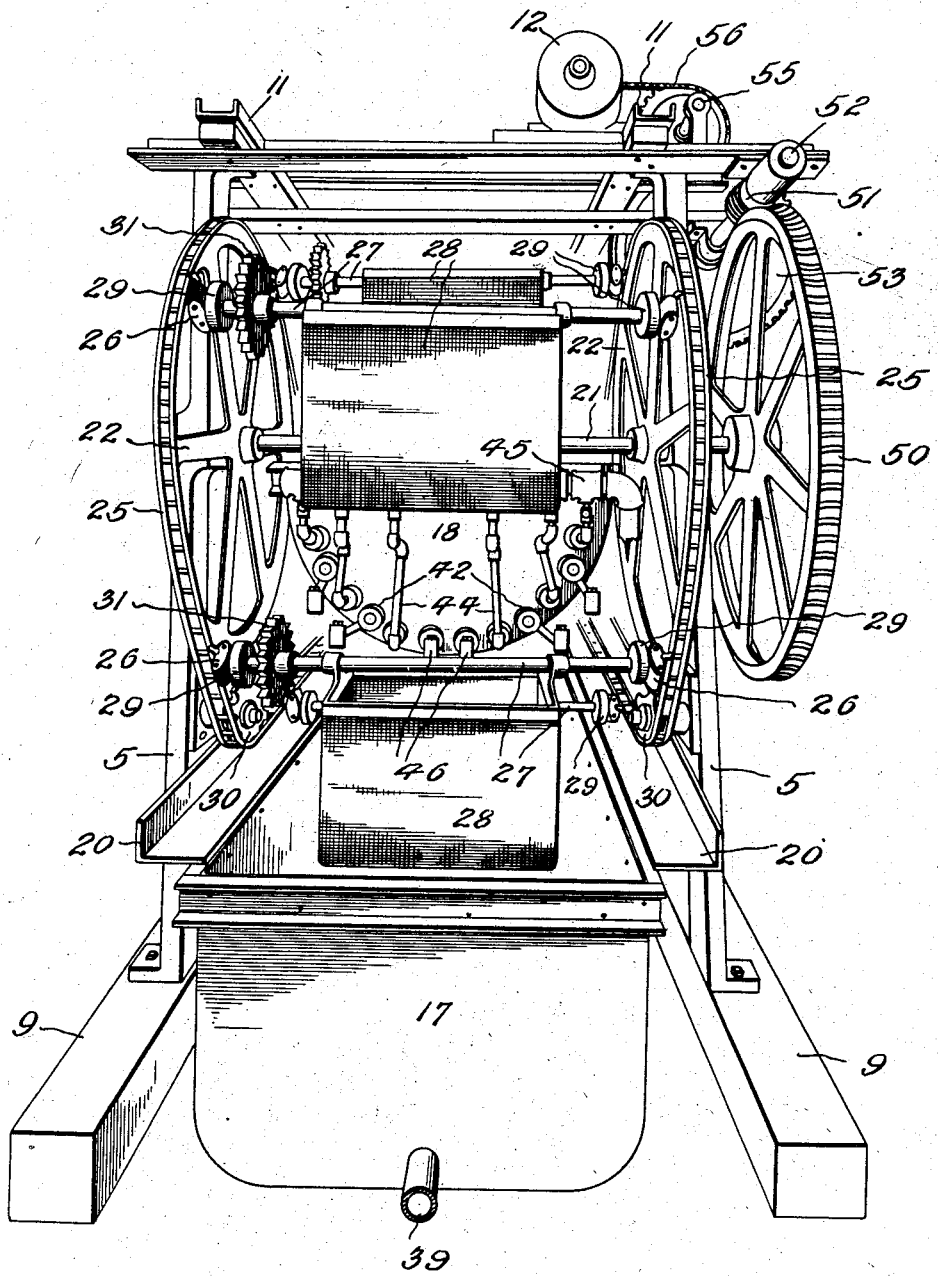

Patented Apr. 26, 1932

1,855,540

UNITED STATES PATENT OFFICE

WILLIAM L. BAKER AND CHARLES F. GREINER, OF NEW ORLEANS, LOUISIANA

WASHING AND COOKING MACHINE

Application filed August 1, 1929. Serial No. 382,820.

The invention relates to a new and improved machine designed primarily for washing and cooking food, although certain features are not restricted to this particular field. One of the principal uses of the machine is for washing and cooking sea food, notably shrimp, and it is one aim to provide a novel and advantageous machine for first washing the shrimp, for then cooking and blanching the same, and for finally discharging the washed, cooked and blanched shrimp upon a conveyor or into a receiver, as may be desired.

A further object is to provide unique means for so agitating the water in the washing tank as to cause the shrimp to lash vigorously about within receptacles in which they are conveyed through said tank, thereby causing them to thoroughly wash themselves.

A further object is to provide a novel arrangement of steam pipes in the cooking tank for the purpose of maintaining a plurality of zones of circulating water in said tank, thereby keeping the shrimp or other contents of the receptacles separated and consequently insuring better results than if such contents were carried through the cooking tank in bunched formation.

A still further object of the invention is to provide novel means for dumping the receptacles when they reach the delivery end of the machine.

Yet another aim is to provide a unique receiving chute into which the receptacles are dumped and to make unique provision for alternately moving said chute into and out of receiving position.

A further object is the provision of a machine which, while being of rather simple construction will be efficient and desirable from all standpoints.

With the foregoing and minor objects in view, the invention resides in the novel subject matter hereinafter described and claimed, description being accomplished by reference to the accompanying drawings.

Figs. 1 and 1ª jointly disclose a longitudinal sectional view partly in elevation, through a machine constructed in accordance with our invention.

Fig. 2 is a perspective view of the delivery end of the machine showing one of the conveying baskets or receptacles in the act of dumping and illustrating the chute in position to receive the contents discharged from said basket or receptacle.

Fig. 3 is a perspective view of the delivery end of the machine illustrating the manner in which the chute is swung to an out-of-the-way position after discharging of each basket or receptacle to permit the latter to pass and again enter the washing tank.

Fig. 4 is a perspective view showing the opposite end of the machine from that illustrated in Figs. 2 and 3.

The general construction shown and described has proven to be highly efficient and desirable from all standpoints and hence such construction may be considered as preferred. However, even though this construction will be rather specifically described for illustrative purposes, it is to be understood that within the scope of the invention as claimed, numerous variations may be made.

The numerals 5, 6, 7 and 8 denote a plurality of pairs of vertical standards secured to and rising from sills 9, there being any suitable number of these standards, according to the length of the machine. The upper ends of the standard 5—8 are connected by transverse plates or the like 10, and secured upon these plates are a number of longitudinal bars 11. Appropriately mounted upon these bars 11 at one end of the machine, we have illustrated an electric motor 12 for driving the entire machine, as will be hereinafter explained. Secured upon the two plates 10 at the opposite end of the machine, are two angle metal bars 13 which project beyond the standards 8 and carry appropriate bearings 14 in which a transverse shaft 15 is rockably mounted, the chute 16 above mentioned, being secured to said shaft 15. The shaft is operated in a manner hereinafter explained, to control the movement of the chute 16 to and from the position at which it receives the contents of the load-carrying receptacles.

Rigidly mounted between the pairs of standards 5—8, are a lower horizontally elongated washing tank 17 and an upper similarly elongated cooking tank 18. Two opposed, parallel, longitudinal tracks 19 are secured to the standards 6—7 and any which may intervene, at the upper longitudinal edges of the cooking tank 18. Two similar tracks 20 are secured to all of the standards 5—8 at the upper edges of the washing tank 17. These tracks and certain rollers co-operable therewith take the real weight of the load carried through the machine, from endless chains which move said load.

Mounted upon a shaft 21 supported in appropriate bearings by the standards 5, are two large sprocket wheels 22. Similarly carried by a shaft 23 supported by the standards 8, are two large sprocket wheels 24, the two shafts 21 and 23 being disposed at the upper edges of the end walls of the cooking tank 18. Two endless chains 25 are trained around the sprocket wheels 22 and 24, said chains having bearings 26 at spaced points in which transverse shafts 27 are rotatably mounted. Secured to these shafts are the receptacles 28, said receptacles being preferably in the form of wire baskets. It is in these baskets that the commodity is carried first through the washing tank 17 and then through the cooking tank 18. The ends of the shafts 27 are provided with rollers 29 which travel upon the tracks 19—20 so that the weight of the basket contents is relieved from the upper and lower reaches of the chains 25. The two reaches of these chains are preferably spaced downwardly from the upper and lower edges of the sprockets 22 and 24, and appropriate idle sprockets 30 are provided on the standards 5 and 8 to guide said reaches at the ends of the tracks 19—20.

Secured to the shafts 27, at one end thereof, are toothed wheels 31. These wheels are successively co-operable with a curved track or rack bar 32 appropriately mounted upon a curved bar 33 which is suitably secured to the frame of the machine. The rack bar 32 is in the path of the wheels 31 and each time one of these wheels engages said rack bar, as shown for instance in Fig. 2, the shaft 27 of this wheel is rotated, causing it to invert the basket 28 as shown in this view. At the time this operation takes place, the chute 16 occupies the receiving position shown in this same figure, so that the basket contents slide down the chute and off into a receiver or to a conveyor, as desired. The position of the chute 16 is controlled by the rollers 29 at one side of the machine, as will hereinafter appear.

We have above stated that the chute 16 is secured to the shaft 15. Also secured to this shaft, are a gear 34 and a weighted arm 35. The gear 34 is in constant mesh with an arcuate rack 36 which is pivotally mounted at 37 upon one of the bars 13. This rack 36 is provided with a depending actuating arm 38 which is cooperable with the rollers 29 at one side of the machine, as will be clear from Figs. 2 and 3. Whenever a roller 29 engages the arm 38, it causes swinging of the rack 36 about the pivot 37 and said rack drives the gear 34 to rotate the shaft 15, thereby outwardly swinging the chute 16 to the position shown in Figs. 1ª and 3. As soon as the roller 29 clears the actuating arm 38 however, the chute 16 swings downwardly and inwardly by gravity to the position illustrated in Fig. 2 and by the time it reaches this position, a basket 28 is inverted to discharge its contents onto said chute. The weighted arm 35 merely counterbalances the weight of the chute 16 to some extent so that it will be less difficult to swing this chute outwardly to the position illustrated in Figs. 1ª and 3.

Extending longitudinally above the bottom of the washing tank 17, is a pipe 39 having perforations 40 at intervals, said pipe extending from a blower or the like 41. Air jets are upwardly discharged from the perforations 40 through the water in the washing tank 17, as indicated by the vertical arrows in Figs. 1 and 1ª. These air jets agitate the water and when shrimp or the like are being carried longitudinally in the tank 17, said jets cause them to lash about vigorously in the baskets 28 so that they will thoroughly wash themselves.

A plurality of steam pipes 42 are disposed longitudinally over the bottom of the cooking tank 18, each of said pipes having a return bend 43 (Fig. 1ª). One end of each pipe communicates by appropriate piping 44 with a steam supply manifold 45 as seen in Figs. 1 and 4. The other end of each pipe is provided with a steam discharge device such as a trap 46. Steam from the piping 44 in passing through any steam pipe 42 and returning to the trap or the like 46, highly heats one reach of the pipe but does not so highly heat the return reach thereof. Hence, with each pipe provided with a comparatively hot and a relatively cool reach, a number of circulating zones of water will be set up in the tank 18. This circulating water is of course at a cooking temperature and in addition to cooking, it causes separation of the contents of the baskets 28 producing better results than could otherwise be obtained.

The baskets 28 are filled before they have traveled any great distance in the tank 17. In the present showing, there is a chute 47 (Figs. 1 and 3) into which the shrimp or the like are dumped at one side of the machine, a hand pusher 48 or other means (Fig. 3) being provided for pushing the shrimp or the like from said chute 47 into the baskets 28 as the latter slowly arrive at positions beneath the inner end of said chute. The baskets 28 convey their contents longitudinally within the washing tank 17 as indicated by the arrows on a number of said baskets in the lower portions of Figs. 1 and 1ª. At the end of the tank 17, the chains 25 and the sprockets 22, elevate the baskets 28 and again lower them so that they are received in the cooking tank 18. In this tank, they travel to the opposite end of the machine, at which point the chains 25 and sprockets 24 elevate them from the tank 18. The wheels 31 co-act with the rack 32 in successively inverting the baskets 28 to a discharge position as will be clear from Fig. 2, and the rollers 29 and arm 38 co-operate in effecting movement of the chute 16 to or from receiving position. When this chute is in the position shown in Fig. 2, it receives the contents of the basket being dumped and such contents will slide down the chute into a receiver or onto a conveyor, as desired. By the time this has taken place, the roller 29 of the basket which has just discharged, strikes the arm 38, swings the latter outwardly as disclosed in Fig. 3, and hence the dumped basket is allowed to pass to again descend into the washing tank 17.

The sprockets 22 or the sprockets 24 may be driven, as may be desired. In the present showing, the shaft 21 of the sprockets 22 is provided with a worm gear 50 meshing with a worm 51 on a short longitudinal shaft 52 which is appropriately mounted (see Figs. 1 and 4). Shaft 52 is provided with a spur gear 53 meshing with a pinion 54 on another short longitudinal shaft 55 which is driven by a chain 56 and appropriate sprockets from the motor 12.

It will be seen from the foregoing that rather simple yet very efficient and advantageous means have been provided for carrying out the objects of the invention and attention is again invited to the fact that within the scope of said invention as claimed, variations may be made.

What is claimed is:—

1. A machine of the class described comprising an upper and a lower tank, sprockets mounted at the ends of the tanks, two endless chains trained around said sprockets and having reaches extending along the upper and lower tanks respectively, openwork receptacles pivotally hung from said chains for passage into, through and out of one of the tanks and then into, through and out of the other tank, a shiftably mounted chute at one end of the machine to successively receive the contents of the receptacles, means synchronized with said chains for shifting said chute alternately to and from receiving position, means for successively dumping said receptacles into said chute, and operating means for the sprockets and for said chute-shifting and receptacle-dumping means.

2. A machine of the class described comprising an upper and a lower tank, sprockets mounted at the ends of the tanks, two endless chains trained around said sprockets and having reaches extending along the upper and lower tanks respectively, openwork receptacles pivotally hung from said chains for passage into, through and out of one of the tanks and then into, through and out of the other tank, a shiftably mounted chute at one end of the machine to receive the contents of the receptacles, means for shifting said chute alternately to and from receiving position, embodying operating members spaced apart along one of said chains and an actuator in the path of said operating members, means for successively dumping said receptacles into said chute, and operating means for said sprockets and said receptacle dumping means.

3. A machine of the class described comprising an upper and a lower tank, sprockets mounted at the ends of the tanks, two endless chains trained around said sprockets and having reaches extending along the upper and lower tanks respectively, openwork receptacles pivotally hung from said chains for passage into, through and out of one of the tanks and then into, through and out of the other tank, a shiftably mounted chute at one end of the machine to successively receive the contents of the receptacles, means for moving said chute alternately to and from receiving position, means for driving certain of the sprockets, and dumping means for the receptacles, embodying individual dumping members for said receptacles and a stationary actuator for successive co-action with said dumping members.

4. A machine of the class described comprising an upper and a lower tank, tracks along said tanks, sprockets mounted at the ends of the tanks, driving means for certain of the sprockets, two endless chains trained around said sprockets, a plurality of transverse shafts extending between and rotatably mounted on said chains, rollers on said shafts engaging said tracks, receptacles secured to said shafts for passage successively through said tanks, wheels secured to said shafts, a stationary track mounted at one end of the machine to be successively engaged by said wheels to turn said shafts and move the receptacles to discharge position, a shiftably mounted chute at said end of the machine to receive the receptacle contents, and means for alternately moving said chute to and from receiving position, embodying an actuator successively struck and actuated by said rollers at one side of the machine.

5. In a machine of the class described, a receptacle, driven carrying means for said receptacle upon which the latter is pivotally hung, said carrying means being adapted to move said receptacle along a predetermined path, a shiftably mounted chute mounted independently of said carrying means at the end of said path to receive the contents of said receptacle, and means for automatically controlling said chute to effect movement thereof to receiving position upon arrival of said receptacle.

6. A structure as specified in claim 5; said last named means embodying an operating member on said carrying means, and an actuator in the path of said operating member.

7. In a machine of the class described, a receptacle, driven carrying means for said receptacle upon which the latter is pivotally hung, said carrying means being adapted to move said receptacle along a predetermined path, a chute at the end of said path to receive the contents of the receptacle, a rockably mounted shaft transverse to said path and secured to said chute to pivotally support the latter for movement to and from receiving position, and means for controlling said shaft to effect swinging of the chute to and from receiving position, said means embodying a swingably mounted actuating arm and an operating member for said arm mounted on the aforesaid carrying means.

8. In a machine of the class described, a receptacle, driven carrying means for said receptacle upon which the latter is pivotally hung, said carrying means being adapted to move said receptacle along a predetermined path, a chute at the end of said path to receive the contents of the receptacle, a rockably mounted shaft transverse to said path and secured to said chute to pivotally support the latter for movement to and from receiving position, a gear secured to said shaft, an arcuate rack meshing with said gear and having a swingably mounted actuating arm, and an operating member for said arm mounted on the aforesaid carrying means, swinging of said arm by said member serving to swing said chute to one position.

9. In a machine of the class described, a pair of parallel horizontally spaced tracks, sprockets mounted at the ends of said tracks, two chains trained around said sprockets respectively, transverse shafts extending between and rotatably mounted on said chains, rollers on said shafts engaging said tracks, wheels secured to said shafts, receptacles also secured to said shafts, a stationary track adapted to be successively engaged by said wheels to effect swinging of said receptacles to dumping position, a shiftably mounted chute to receive the contents of the receptacles, and means for moving said chute alternately to and from receiving position, embodying an actuator adapted to be successively struck and moved by the aforesaid rollers at one side of the machine.

10. A combined washing and cooking machine comprising a water-containing washing tank, a water-containing cooking tank, means for heating the water in said cooking tank to a cooking temperature, an openwork receptacle for the commodity to be washed and cooked, means for conveying said receptacle first through the water in said washing tank and then through the water in said cooking tank, and means for agitating the water received in said receptacle as the latter travels through the water in said washing tank, thereby effecting thorough washing of the commodity.

In testimony whereof we have hereunto affixed our signatures.

WILLIAM L. BAKER.
CHARLES F. GREINER.